Aug. 5, 1969    R. R. DIXON ET AL    3,459,628
URETHANE FOAM CORROSION PROTECTION
Filed May 18, 1966
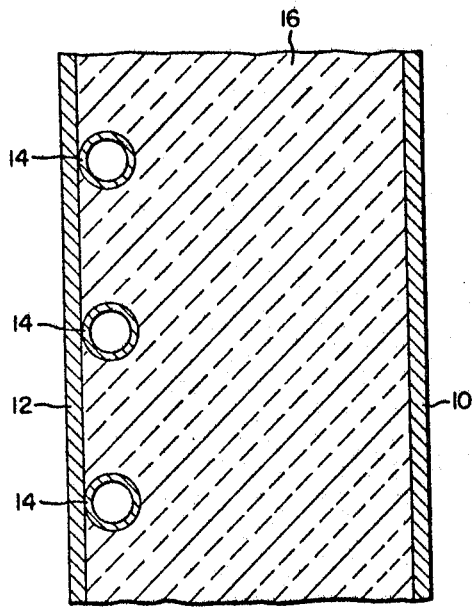
WITNESSES
Theodore T. Wrobel
Lee P. Johns
INVENTORS
Robert R. Dixon
and Leonard C. Flowers
BY
Frederick A. Cooper
ATTORNEY 3,459,628
URETHANE FOAM CORROSION PROTECTION
Robert R. Dixon, Columbus, Ohio, and Leonard C. Flowers, Murrysville, Pa., assignors to Westinghouse Electric Corporation, Pittsburgh, Pa., a corporation of Pennsylvania
Filed May 18, 1966, Ser. No. 551,070
Int. Cl. B32b 5/18; C08d 13/08
U.S. Cl. 161—161
6 Claims This invention relates to corrosion protection of metal parts forming the cold wall of a thermally insulated structure. More particularly, the invention pertains to the addition of an acid absorber or neutralizer to polyurethane foam when used as thermal insulation for a refrigerator or freezer.

Experience with the use of polyurethane foam for thermal insulation of a refrigerator or freezer indicates that moisture can enter the foam from the ambient atmosphere via cracks or joints in the exterior walls of the unit. Moisture or water vapor can diffuse through the cell walls of the foam rather readily, and it tends to migrate to the area of lowest vapor pressure which is the cold wall of the refrigerator or portions adjacent the refrigerant tubing. When reaching the area of lowest vapor pressure the moistue vapor can condense to liquid water because of the low temperature. If no barrier material were present, the water and its associated ions and hydrolysis products developed therewith would be in contact with the aluminum tubing of the refrigeration system and would corrode it over a period of time to a point of complete failure. One hydrolysis or water reaction product likely to be present in polyurethane foams is hydrochloric acid which is derived from halogenated gases in the foam, and the acid attacks the metal wall, or the tubing of the cold wall freezer, to cause failure of the refrigeration system.

Since it is virtually impossible to completely seal the foam insulation space to extend moisture, other alternatives have been attempted. One alternative to prevent corrosion has been the substitution of steel or copper tubing for aluminum tubing. But that merely results in minimization rather than correction of the problem. Another alternative has been to cover the tubes or cold wall with a layer of barrier material such as paint or asphalt which coating is undesirable for various reasons including its minimum durability and added cost.

In accordance with this invention it has been found that a finely divided antiacid additive can be readily and economically incorporated in the polyurethane foam embodying a halogenated organic compound to absorb or neutralize the acid formed and thereby eliminate the attack on the metal walls or tubing. The hydrolysis of the foam is relatively slow in its initial stages for which reason the amount of acid formed is initially small. The function of the antiacid additive is to absorb or neutralze the initial traces of acid being formed and thus inhibit the autocatalytic generation of increasingly larger amounts of acid which would otherwise be formed. The amount of the antiacid additive may be kept at a minimum which has the added advantage of not affecting the desirable properties of the polyurethane foam.

Accordingly, it is an object of this invention to provide a polyurethane foam composition which absorbs or neutralizes any acids formed due to hydrolysis or reaction with water which would have a corrosive effect on metal walls or tubing of a refrigerator or freezer.

It is another object of this invention to provide a polyurethane foam composition which incorporates a finely divided antiacid additive which eliminates acid attack on metal walls or tubing.

It is another object of this invention to provide a polyurethane foam composition having small additions of zinc oxide or other inhibitors.

Finally it is an object of this invention to satisfy the foregoing problems and desiderata in a simple and expedient manner.

Briefly the present invention may be stated in general terms as including a thermally insulated structure having an inner liner wall and an outer wall forming an insulation chamber, insulation within the chamber composed of polyurethane foam which is derived by reacting a polyether or polyvester polyol, and a diisocyanate, a small amount of a catalyst, a small amount of a surfactant, a stabilized blowing agent such as trichloromonofluoromethane, and up to 1% by weight of finely divided antiacid additive, the diisocyanate reacting with the polyol to form a temporary liquid resin which is blown by the blowing agent into a rigid solid foam insulation filling the chamber.

The accompanying drawing is illustrative of the apparatus with which the present invention is used.

In the drawing, a fragment of a vertical section through a thermally insulated structure such as a freezer is shown having an outer wall 10, an inner wall 12, refrigerant tubing 14, and thermal insulation 16 such as polyurethane foam in the space between the walls 10 and 12. The outer wall 10 may be composed of sheet metal such as of steel or aluminum. The inner wall 12 is composed of sheet metal such as aluminum steel or copper. The refrigeration tubing may be composed of similar materials. A suitable polyurethane foam 16 is a fine cellular material such as that disclosed in U.S. Patent No. 3,072,582 entitled Polyether-Urethane Foams and Method of Making Same.

The thermal insulation foam 16 is introduced into the chamber between the walls 10 and 12 by first mixing and then injecting the mixture of the liquid components which are permitted to interact within the confines of the walls 10 and 12 to form a polyurethane foam. A suitable process is to prepare interacting liquids comprising a premix and the diisocyanate. An example of the premix consists of a sucrose base polyether polyol, 1% by weight of a catalyst such as dimethylethanolamine, 1% by weight of a surfactant such as dimethyl silicone liquid, 28% by weight of a blowing agent such as trichloromonofluoromethane, and up to 1% by weight of a finely powdered antiacid additive.

The preferred diisocyanate is tolylenediisocyanate The premix is maintained in a relatively stable condition by storing at a temperature not exceeding 65° F. and is mixed with the isocyanate in a ratio of about 1.56 to 1. A predetermined quantity of the mixture of premix and isocyanate is injected into the space between the inner and outer walls 10 and 12 which have been preliminary preheated to a temperature range of 125° to 135° F. and preferably at about 130° F. The premix and the isocyanate react rapidly at these temperatures to form a foam which completely fills the space. After the reaction is completed the assembly is held at temperature for about 15 minutes to permit curing of the reaction product namely the polyurethane foam which contains the gaseous triclorofluoromethane in the closed cells thereof.

Subsequently, when the foam is exposed to moisture a reaction occurs substantially in accordance with the following formula:

$$CCl_3F + H_2O \rightarrow HCl + CO_2 + CHCl_2F$$

The exact nature of the hydrolysis reaction is unknown but presumably involves the detachment of one or more of the chlorine atoms from the $CCl_3F$ molecule and the recombination of the atoms with hydrogen atoms derived either from the moisture itself or from the action of moisture on the other ingredients of the foam.

Without an additive or absorber for neutralizing the hydrochloric acid formed substantially as described above, the acid would diffuse through the foam to the colder inner wall 12 of the structure and attack and corrode the metal of which the wall 12 and tubes 14 are composed.

By adding a relatively small amount of an antiacid additive to the premix, the resulting acid is neutralized and rendered inactive. For the purpose of this invention the additive may be zinc oxide (ZnO) or other inhibitor such as organic tin compounds and epoxy compounds. An example of an organic tin compound is tetraphenyl tin. An example of the epoxy compound is phenoxy propene oxide such as disclosed in U.S. Patent No. 2,840,627. Such additives, if solid at room temperature, are preferably in the form of extremely fine powders and uniformly distributed throughout the resulting foam. An additive such as zinc oxide may be added in an amount of up to 1% by weight of the premix and preferably is added in an amount of about 0.1% by weight. The zinc oxide has a mean particle size of about 0.1 micron, normally found in U.S.P. grade.

Other acid absorbant materials may include hydrated alumina ($Al_2O_3 \cdot 3H_2O$) or ($Al_2(OH)_3$), magnesium oxide and magnesium hydroxide.

Oxides and hydroxides of the Group II metals of a molecular weight of less than 200 which are non-destructive to the polyurethane foam may be used. Mixtures of two or more antiacid additives may be employed for example zinc oxide and hydrated alumina in equal amounts. However, strong alkalies are undesirable.

Accordingly, the composition of the present invention satisfactorily solves the prior existing problem of acid formation and subsequent corrosion upon moisture absorption by the polyurethane foam insulation in a thermally insulated structure such as a refrigerator or freezer. By incorporating an antiacid additive into the premix of which the foam is prepared, any corrosive acid formed as a result of absorption of moisture which reacts with the foam is neutralized by the additive and rendered ineffective as a corrosive agent on the metal surfaces of the freezer or refrigerator.

What is claimed is:

1. In a thermally insulated structure having an inner cold wall and an outer wall, the inner wall being metal and spaced from the outer wall, and having foamed insulation embodying a volatile halogenated organic compound between and in contact with the walls, the halogenated organic compound tending in the presence of moisture to decompose to form acidic products, the improvement comprising incorporating an effective amount of a finely divided antiacid into the foamed insulation to provide for a neutralizing reaction with the acidic products.

2. The structure of claim 1 in which the insulation is composed of polyurethane foam embodying a chlorinated organic compound.

3. The structure of claim 1 in which the finely divided antiacid is at least one compound selected from the group consisting of the oxides and hydroxides of Group II elements of a molecular weight of less than 200, organic tin compounds, epoxides, hydrated alumina, magnesium oxide, and magnesium hydroxide in amounts of up to 1% by weight.

4. The structure of claim 3 in which the antiacid additive is from about 0.1 to 1% by weight of zinc oxide.

5. The structure of claim 3 in which from 0.1 to 1% of tetraphenyl tin is present as the antiacid.

6. The structure of claim 3 in which from 0.1 to 1% of phenoxy propene oxide is present as the antiacid.

References Cited
UNITED STATES PATENTS

| | | | |
|---|---|---|---|
| 3,091,946 | 6/1963 | Kesling | 161—161 |
| 3,297,582 | 1/1967 | Pawlyk | 260—2.5 |

ROBERT F. BURNETT, Primary Examiner

WILLIAM J. VAN BALEN, Assistant Examiner

U.S. Cl. X.R.

260—2; 264—45; 312—214